US011424655B2

(12) United States Patent
Kawaguchi et al.

(10) Patent No.: US 11,424,655 B2
(45) Date of Patent: Aug. 23, 2022

(54) DRIVE DEVICE

(71) Applicant: DENSO CORPORATION, Kariya (JP)

(72) Inventors: Gou Kawaguchi, Kariya (JP); Naohiro Yamamato, Kariya (JP)

(73) Assignee: DENSO CORPORATION, Kariya (JP)

( * ) Notice: Subject to any disclaimer, the term of this patent is extended or adjusted under 35 U.S.C. 154(b) by 82 days.

(21) Appl. No.: 16/874,639

(22) Filed: May 14, 2020

(65) Prior Publication Data
US 2020/0366164 A1 Nov. 19, 2020

(30) Foreign Application Priority Data

May 17, 2019 (JP) .............................. JP2019-093610

(51) Int. Cl.
H02K 5/10 (2006.01)
H02K 5/15 (2006.01)
(Continued)

(52) U.S. Cl.
CPC ................. H02K 5/10 (2013.01); H02K 5/15 (2013.01); H02K 11/21 (2016.01); H02K 11/33 (2016.01); H02K 11/38 (2016.01); B62D 5/0406 (2013.01)

(58) Field of Classification Search
CPC .......... H02K 11/33; H02K 11/21; H02K 5/15; H02K 5/10; H02K 5/225; H02K 11/38; H02K 9/227; H02K 2211/03; H02K 5/00; H02K 5/02; H02K 5/04; H02K 5/06; H02K 5/08; H02K 5/22; H02K 11/00; H02K 11/30; B62D 5/0406
(Continued)

(56) References Cited

U.S. PATENT DOCUMENTS 9,949,394 B2 * 4/2018 Kamoshida .......... H05K 5/0026
2015/0115755 A1 4/2015 Yamasaki et al.
(Continued)

FOREIGN PATENT DOCUMENTS

JP 2007-185055 A 7/2007
WO WO-2018079420 A1 * 5/2018 ............... H05K 5/06
WO WO-2019159405 A1 * 8/2019 ............ B62D 5/0406

OTHER PUBLICATIONS

Hamada Keiji, Electric Drive Device and Electric Power Steering Device, Hitachi Automotive Systems, WO 2019159405 (English Machine Translation) (Year: 2019).*
(Continued)

Primary Examiner — Quyen P Leung
Assistant Examiner — Alexander A Singh
(74) Attorney, Agent, or Firm — Maschoff Brennan

(57) ABSTRACT

A drive device includes an annular cover having an inner peripheral opening, and a drive unit to which the annular cover is attached. The drive device includes an inner peripheral adhesive that bonds the inner peripheral end of the annular cover to the drive unit, and includes an outer peripheral adhesive that bonds the outer peripheral end of the annular cover to the drive unit. Therefore, the drive unit and the annular cover can be bonded to each other at a plurality of locations. Therefore, it is easier to firmly fix and fix the components to each other as compared with a configuration in which the only one bonding location is provided. Therefore, it is possible to provide the drive device in which components are properly adhered and fixed to each other.

13 Claims, 6 Drawing Sheets

(51) Int. Cl.
  *H02K 11/33*  (2016.01)
  *H02K 11/38*  (2016.01)
  *H02K 11/21*  (2016.01)
  *B62D 5/04*  (2006.01)

(58) Field of Classification Search
  USPC .................................................. 310/89, 68 R
  See application file for complete search history.

(56) References Cited

U.S. PATENT DOCUMENTS

| | | | | |
|---|---|---|---|---|
| 2016/0094104 | A1* | 3/2016 | Yamasaki | H02K 11/33 |
| | | | | 310/68 D |
| 2016/0165736 | A1* | 6/2016 | Tsuboi | H02K 11/33 |
| | | | | 310/71 |
| 2016/0218583 | A1* | 7/2016 | Hayashi | H02K 5/10 |
| 2018/0183294 | A1 | 6/2018 | Nishikawa et al. | |
| 2019/0252953 | A1* | 8/2019 | Matsuo et al. | H02K 5/22 |
| 2019/0296602 | A1 | 9/2019 | Miyachi et al. | |
| 2019/0372420 | A1* | 12/2019 | Ogawa | H02K 11/33 |

OTHER PUBLICATIONS

U.S. Appl. No. 16/874,637 and its entire file history, filed May 14, 2020, Yamauchi et al.

\* cited by examiner

DRIVE DEVICE

CROSS REFERENCE TO RELATED APPLICATION

The present application claims the benefit of priority from Japanese Patent Application No. 2019-093610 filed on May 17, 2019. The entire disclosure of the above application is incorporated herein by reference.

TECHNICAL FIELD

The disclosure in this specification relates to a drive device.

BACKGROUND

A drive device typically includes several components that are assembled together, such as a motor, a housing, and a cover.

SUMMARY

In one aspect of this disclosure, a drive device includes an annular cover having an inner peripheral opening portion, a drive unit to which the annular cover is attached, an inner peripheral adhesive that adheres an inner peripheral end portion of the annular cover to the drive unit, and an outer peripheral adhesive that adheres an outer peripheral end portion of the annular cover to the drive unit.

DETAILED DESCRIPTION

Figure 1:
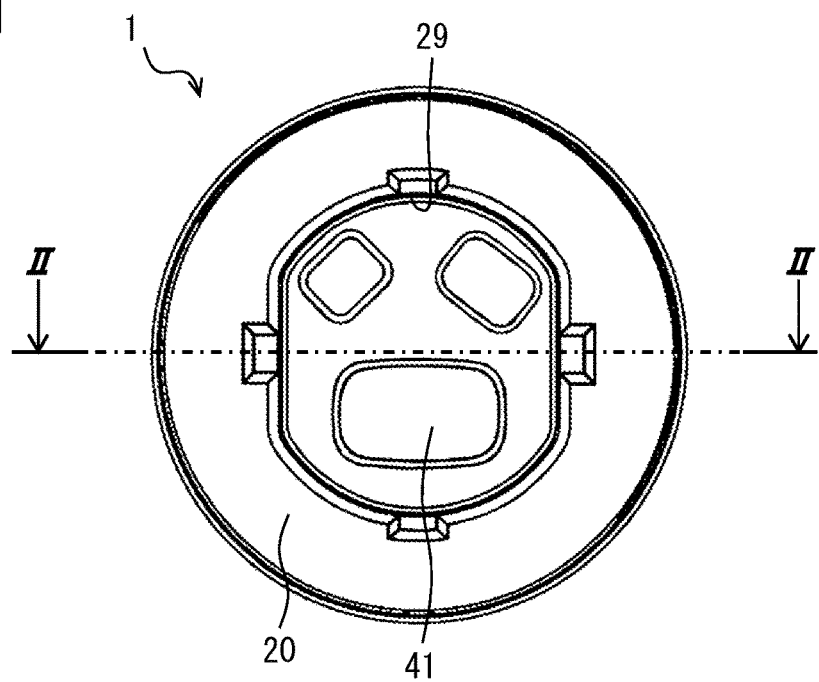
FIG. 1 is a top view showing a drive device.

Embodiments will be described with reference to drawings. In some embodiments, parts that are functionally and/or structurally corresponding to each other and/or associated with each other are given the same reference numerals, or reference numerals with different hundred digit or more digits. For corresponding parts and/or associated parts, additional explanations can be made to the description of other embodiments.

First Embodiment

A drive device 1 is a device that performs electric drive operation, and can be used as a rotating electric machine device such as a motor device or a power generation device. Alternatively, the drive device 1 can also be used for an actuator device that does not involve rotation. The drive device 1 can be used, for example, as a device mounted on a vehicle and constituting a part of an electric power steering device. Hereinafter, a case where the drive device 1 is used as a part of an electric power steering device for a vehicle will be described as an example.

Figure 2:
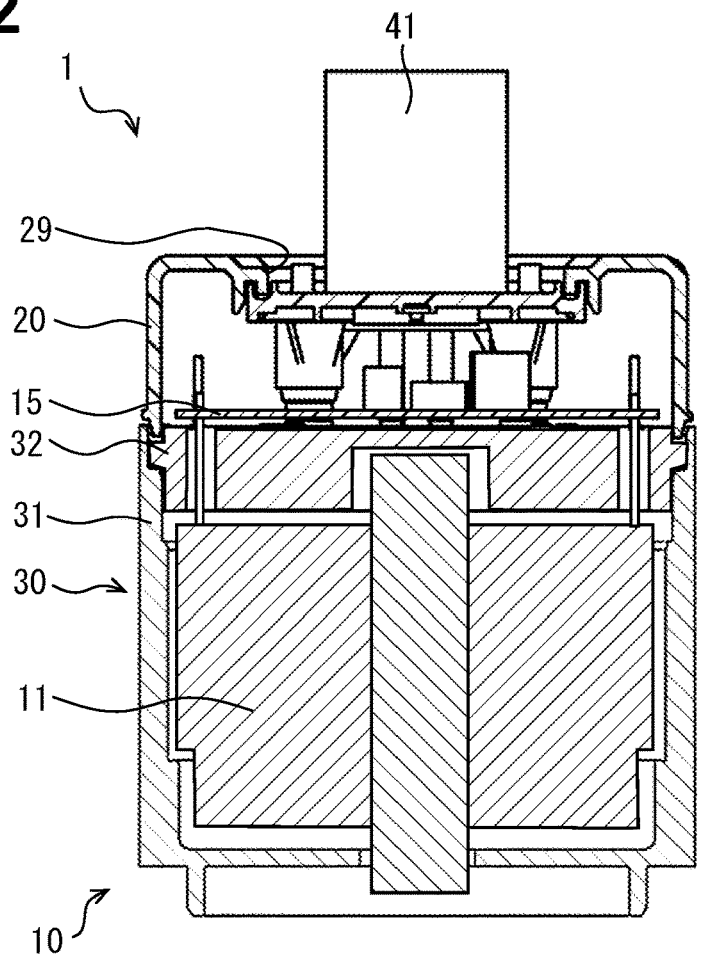
FIG. 2 is a cross-sectional view showing a cross section taken along line II-II of FIG. 1.

In FIGS. 1 and 2, the drive device 1 includes a drive unit 10 and an annular cover 20. The drive unit 10 includes a motor 11, a circuit substrate 15, a frame 30, and a connector 41. The motor 11 is an electric motor that converts electric energy into rotational motion. The motor 11 is a device that provides the driving force of the drive device 1. Alternatively, this driving force may be provided by using a device such as an actuator instead of the motor 11. The frame 30 has a bottomed cylindrical shape. The frame 30 includes a motor case 31 that is a cylindrical body, and a frame end 32 that forms a bottom surface. Here, the term "bottom" refers to the closed portion of the frame 30, and is not intended to refer to directionality. The frame 30 houses the motor 11 in a housing space surrounded by the motor case 31 and the frame end 32. The motor case 31 and the frame end 32 are made of a metal material having high thermal conductivity.

The circuit substrate 15 includes a plurality of circuit components for controlling the motor 11. Part of the circuit substrate 15 is in contact with the frame end 32. Heat generated in the circuit components of the circuit substrate is transmitted to the frame end 32 and dissipated from the frame end 32. In other words, the frame end 32 functions as a heat sink that promotes cooling of the circuit substrate 15. The connector 41 is a component for transmitting signals, electric power, etc. from outside the drive device 1 to the motor 11 and the circuit substrate 15. The ends of the windings of the motor 11 penetrate through the circuit substrate 15 and protrude out away from the side where the motor 11 is arranged.

The annular cover 20 is mounted on the drive unit 10. The annular cover has an inner peripheral opening 29 forming an opening at the center of the annular cover 20. When the annular cover 20 is mounted on the drive unit 10, a part of the connector 41 protrudes outward from the opening formed by the inner peripheral opening 29. The annular cover 20 is a resin component and may be formed of, for example, a resin such as polybutylene terephthalate.

When the annular cover 20 is attached to the drive unit 10, only a part of the connector 41 is exposed to outside. As such, the remaining part of the connector 41, the circuit substrate 15, and the frame end 32 are not exposed to outside. In other words, by attaching the annular cover 20, it is possible to prevent water and dust from adhering to the circuit substrate 15 and the like, thereby protecting the circuit substrate 15.

Figure 3:
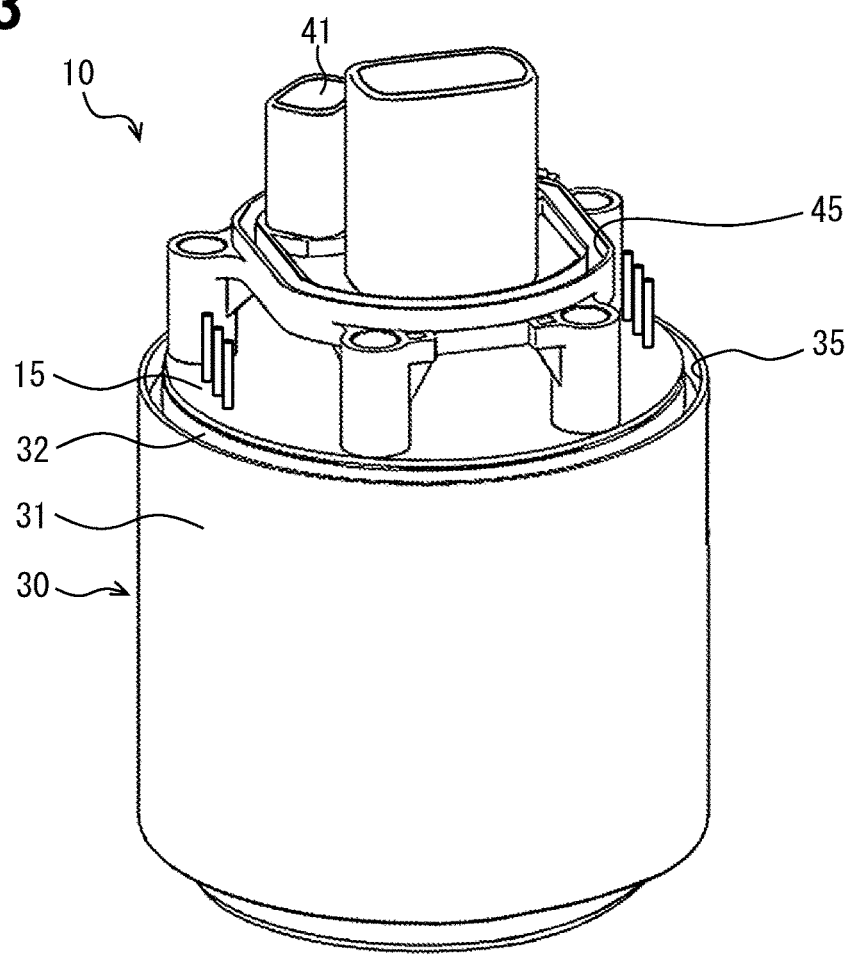
FIG. 3 is a perspective view showing a drive unit.

In FIG. 3, the circuit substrate 15 has a substantially disk shape. The circuit substrate 15 is provided so as to cover the frame end 32. An outer peripheral adhesion recess portion 35 is formed in the frame 30. The outer peripheral adhesion recess portion 35 has a continuous annular shape. The outer peripheral adhesion recess portion 35 is provided radially outward of the circuit substrate 15. Here, radially refers to the rotation axis of the motor 11. The outer peripheral adhesion recess portion 35 is a groove formed by two members, the motor case 31 and the frame end 32.

The connector 41 has an inner peripheral adhesion recess portion 45 formed therein. The inner peripheral adhesion recess portion 45 has a continuous annular shape. The inner peripheral adhesion recess portion 45 is provided radially inward of the outer peripheral adhesion recess portion 35 with respect to the rotation axis of the motor 11. The inner peripheral adhesion recess portion 45 is provided at a position away from the frame end 32. In other words, the inner peripheral adhesion recess portion 45 is provided at a position offset from the outer peripheral adhesion recess portion 35 along the axial direction of the rotation axis of the motor 11.

Figure 4:
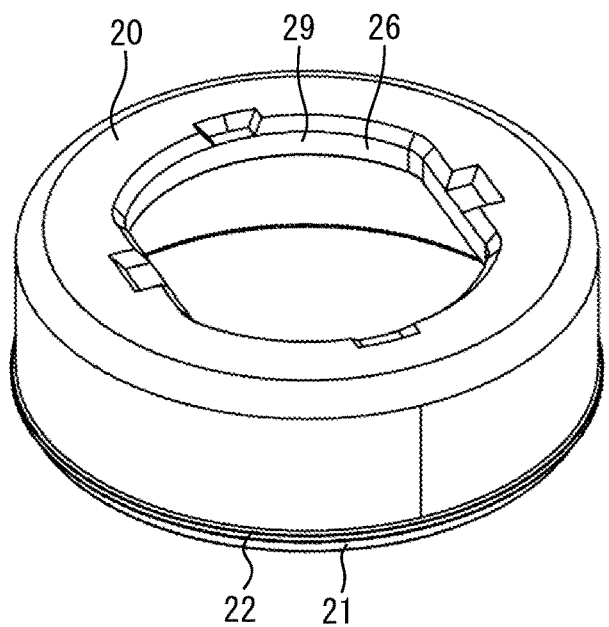
FIG. 4 is a perspective view showing an annular cover.

In FIG. 4, the annular cover 20 has a bottomed cylindrical shape. At the center of the bottom surface of the annular cover 20, an inner peripheral opening 29 forming a substantially circular opening is provided. Here as well, the term "bottom" is only intended to refer to the closed side of the annular cover 20, and does not limit directionality. The shape of the inner peripheral opening 29 may be any shape as long as at least a part of the connector 41 can be exposed to the outside, and is not limited to a substantially circular shape. For example, the shape may be a square shape or a semicircle shape, or may be a complex shape formed by combining various shapes.

The annular cover 20 includes the inner peripheral opening 29 which is an inner peripheral end portion, and also includes an outer peripheral end portion which is on the opposite side as the inner peripheral end portion. The outer peripheral end portion is located outward of the inner peripheral end portion. When the annular cover 20 is attached to the drive unit 10, the distance from the outer peripheral end portion to the frame 30 is less than the distance from the inner peripheral end portion to the frame 30.

An outer peripheral adhesion protrusion portion 21 is formed by the outer peripheral end portion. The outer peripheral adhesion protrusion portion 21 protrudes toward the frame 30. The outer peripheral adhesion protrusion portion 21 is provided continuously in an annular shape over the entire outer peripheral end portion. An outer surface protrusion portion 22 that protrudes from the outer surface of the annular cover 20 is formed near the outer peripheral adhesion protrusion portion 21. The protruding direction of the outer peripheral adhesion protrusion portion 21 and the protruding direction of the outer surface protrusion portion 22 are directions which intersect each other. The outer surface protrusion portion 22 is provided continuously in an annular shape along the outer surface of the annular cover 20. The outer surface protrusion portion 22 faces an end portion of the motor case 31. The outer peripheral adhesion protrusion portion 21 is one an example of an outer peripheral end portion.

An inner peripheral adhesion protrusion portion 26 is formed by the inner peripheral end portion. The inner peripheral adhesion protrusion portion 26 protrudes toward the frame 30. The protruding direction of the outer peripheral adhesion protrusion portion 21 is the same as the protruding direction of the inner peripheral adhesion protrusion portion 26. The inner peripheral adhesion protrusion portion 26 is provided continuously in an annular over the entire inner peripheral end portion. The inner peripheral adhesion protrusion portion 26 is one example of an inner peripheral end portion.

Figure 5:
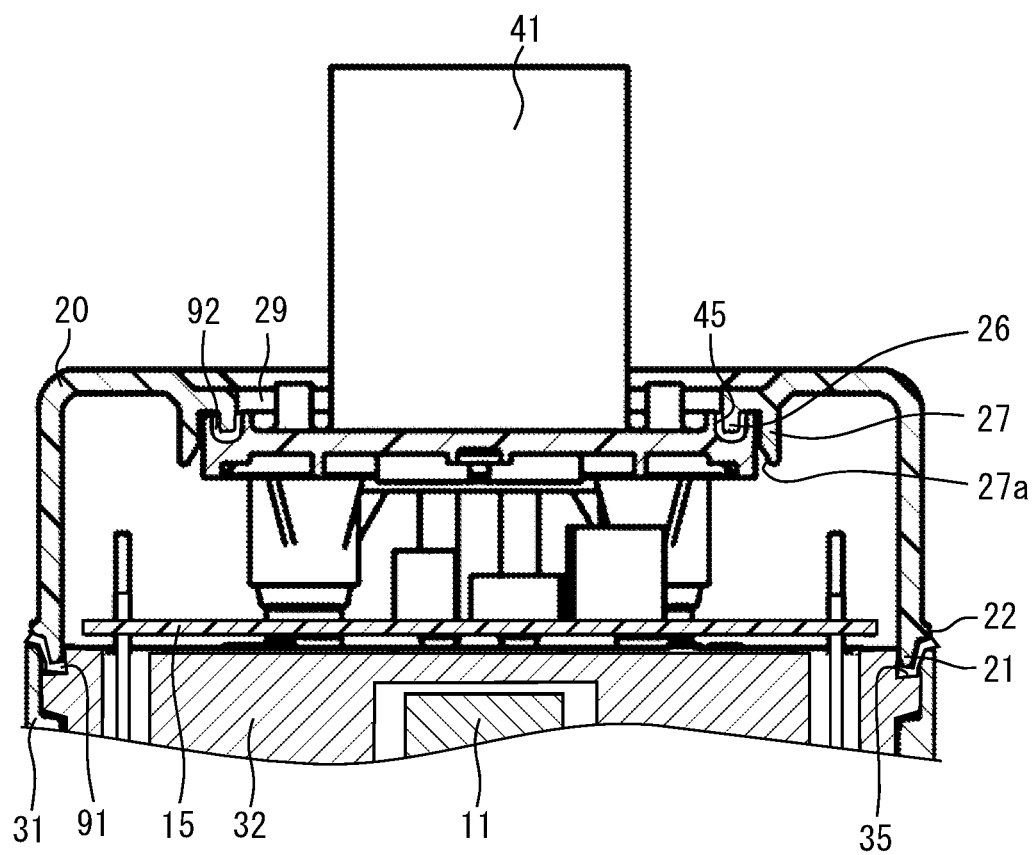
FIG. 5 is a partial enlarged view showing an adhesive portion between a drive unit and an annular cover.

In FIG. 5, a positioning portion 27 is formed near the inner peripheral adhesion protrusion portion 26. The positioning portion 27 is located outward of the inner peripheral adhesion protrusion portion 26. The positioning portion 27 is formed so as to protrude toward the frame 30. The protruding direction of the inner peripheral adhesion protrusion portion 26 is the same as the protruding direction of the positioning portion 27. The positioning portion 27 includes an inclined portion 27a whose projection amount increases as the distance from the inner peripheral adhesion protrusion portion 26 increases. The inclined portion 27a has a tapered shape forming a flat surface. The inclined portion 27a is not limited to having a tapered shape. For example, the tip portion of the positioning portion 27 may be rounded into a curved shape to provide a rounded portion instead.

An outer peripheral adhesive 91 is provided between the outer peripheral adhesion protrusion portion 21 and the outer peripheral adhesion recess portion 35. The outer peripheral adhesive 91 fixes the annular cover 20 to the frame 30 by bonding the outer peripheral adhesion protrusion portion 21 to the outer peripheral adhesion recess portion 35. The outer peripheral adhesive 91 is provided annularly and continuously between the outer peripheral adhesion protrusion portion 21 and the outer peripheral adhesion recess portion 35. This prevents foreign matter from entering between the outer peripheral adhesion protrusion portion 21 and the outer peripheral adhesion recess portion 35. In other words, the outer peripheral adhesive 91 has two functions: a bonding function of bonding and fixing the annular cover 20 to the frame 30, and a sealing function of sealing between the annular cover 20 and the frame 30.

An inner peripheral adhesive 92 is provided between the inner peripheral adhesion protrusion portion 26 and the inner peripheral adhesion recess portion 45. The inner peripheral adhesive 92 fixes the annular cover 20 to the connector 41 by adhering the inner peripheral adhesion protrusion portion 26 to the inner peripheral adhesion recess portion 45. The inner peripheral adhesive 92 is provided annularly and continuously between the inner peripheral adhesion protrusion portion 26 and the inner peripheral adhesion recess portion 45. This prevents foreign matter from entering between the inner peripheral adhesion protrusion portion 26 and the inner peripheral adhesion recess portion 45. In other words, the inner peripheral adhesive 92 has two functions: a bonding function of bonding and fixing the annular cover 20 to the connector 41, and a sealing function of sealing between the annular cover 20 and the connector 41.

As the outer peripheral adhesive 91 and the inner peripheral adhesive 92, for example, a silicone-based adhesive can be used. However, the outer peripheral adhesive 91 and the inner peripheral adhesive 92 only need to have a function of bonding and fixing components to each other and a sealing function of preventing foreign matter such as water from entering from a portion where the components are bonded. In other words, the present disclosure is not limited to using silicone-based adhesives. For example, an acrylic adhesive or an epoxy adhesive can be used.

Figure 6:
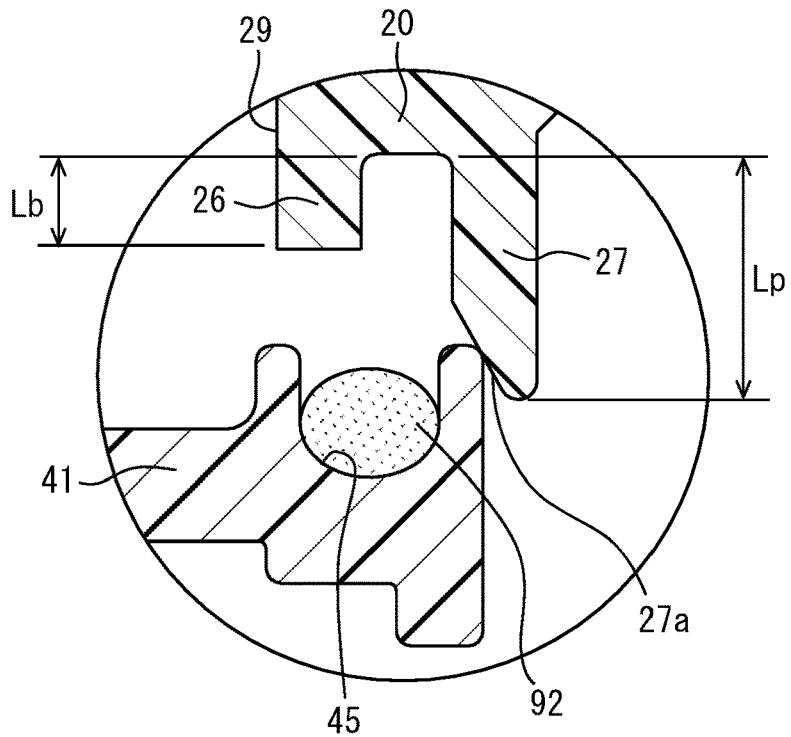
FIG. 6 is an explanatory view showing a state in which a connector and an annular cover are being positioned.

The bonding between the inner peripheral adhesion protrusion portion 26 and the inner peripheral adhesion recess portion 45 will be described below. FIG. 6 shows a state prior to positioning the annular cover 20 with respect to the drive unit 10. The inner peripheral adhesive 92 is provided in the inner peripheral adhesion recess portion 45 and is surrounded on three sides. At this point, the inner peripheral adhesive 92 is in a soft state prior to hardening.

The annular cover 20 is moved toward the connector 41 while maintaining the state in which the inner peripheral adhesion protrusion portion 26 and the inner peripheral adhesion recess portion 45 face each other. Since the annular cover 20 is slightly offset inward from the correct position, the inclined portion 27a and the connector 41 come into contact with each other. When the inner peripheral adhesion protrusion portion 26 is further brought closer to the inner peripheral adhesion recess portion 45 while the inclined portion 27a and the connector 41 are in contact with each other, the position of the annular cover 20 is guided toward the correct position by the inclined portion 27a. In other words, the inclined portion 27a functions as a guide that guides the annular cover 20 to an appropriate position. Here, a protrusion amount Lp of the positioning portion 27 is greater than a protrusion amount Lb of the inner peripheral adhesion protrusion portion 26. For this reason, while the annular cover 20 is being guided to the appropriate position, the inner peripheral adhesion protrusion portion 26 is not in contact with the connector 41. Therefore, the guide function of the inclined portion 27a is not hindered by other portions such as the inner peripheral adhesion protrusion portion 26.

Figure 7:
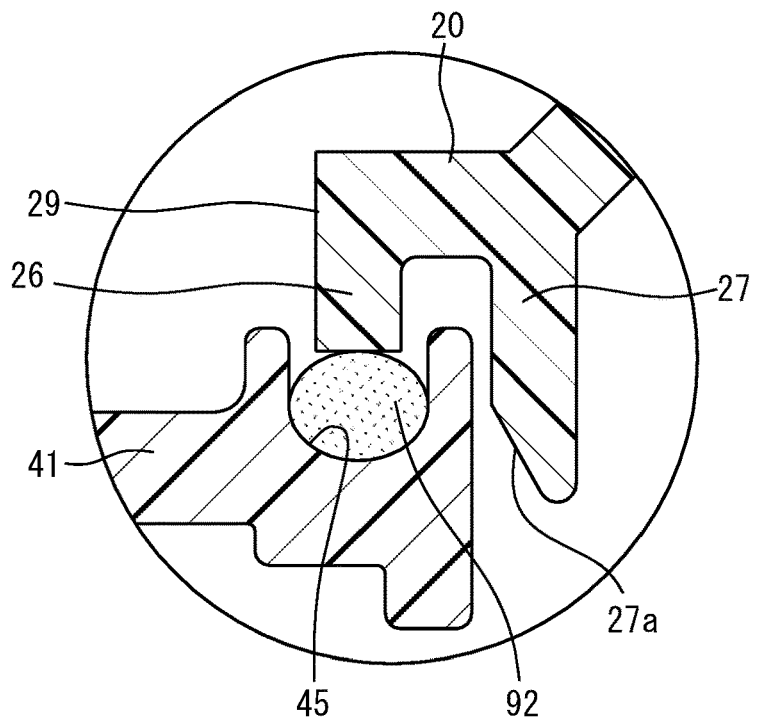
FIG. 7 is an explanatory view showing a state prior to bonding between an inner peripheral adhesion protrusion portion and an inner peripheral adhesion recess portion.

FIG. 7 shows a state after the annular cover 20 has been positioned with respect to the drive unit 10 and before the inner peripheral adhesion protrusion portion 26 and the inner peripheral adhesion recess portion 45 are bonded to each other. The inner peripheral adhesion protrusion portion 26 and the inner peripheral adhesion recess portion 45 are further closer to each other, and a part of the inner peripheral adhesion protrusion portion 26 is inserted into the inner peripheral adhesion recess portion 45. The direction in which the inner peripheral adhesion protrusion portion 26 is inserted into the inner peripheral adhesion recess portion 45 is the direction in which the annular cover 20 is assembled. In other words, the projection direction of the inner peripheral adhesion protrusion portion 26 is the same as the direction in which the annular cover 20 is assembled. On the other hand, a part of the connector 41 constituting the inner peripheral adhesion recess portion 45 is inserted between the inner peripheral adhesion protrusion portion 26 and the positioning portion 27.

The annular cover 20 is moved in the assembly direction beyond the position where the inner peripheral adhesion protrusion portion 26 comes into contact with the inner peripheral adhesive 92. As a result, the inner peripheral adhesive 92 is pushed and spread out by the inner peripheral adhesion protrusion portion 26, and the inner peripheral adhesive 92 spreads to all corners. Therefore, even if the inner peripheral adhesive 92 is discontinuously applied prior to the bonding, the inner peripheral adhesive 92 is expanded and spread by the inner peripheral adhesion protrusion portion 26 so that the inner peripheral adhesive 92 is continuously provided in a ring shape.

Figure 8:
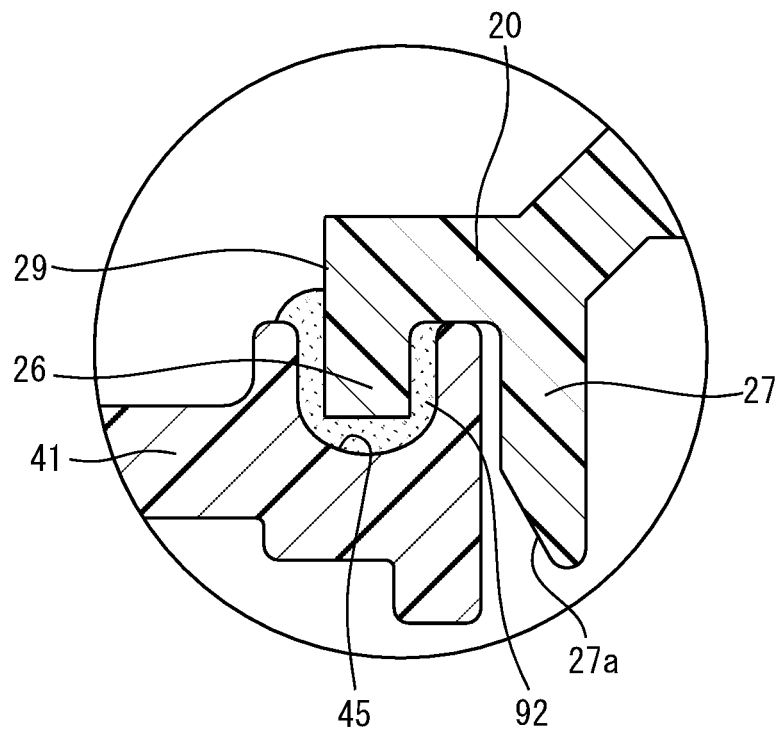
FIG. 8 is an explanatory view showing a state after bonding between an inner peripheral adhesion protrusion portion and an inner peripheral adhesion recess portion.

FIG. 8 shows a state after the inner peripheral adhesion protrusion portion 26 and the inner peripheral adhesion recess portion 45 are adhered and fixed to each other. The inner peripheral adhesive 92 is in contact with and fixed to the two components, i.e., the annular cover 20 and the connector 41. At this time, the inner peripheral adhesive 92 is solidified in a state of being provided continuously in an annular shape between the inner peripheral adhesion protrusion portion 26 and the inner peripheral adhesion recess portion 45. In other words, the inner peripheral adhesive 92 fills the space between the inner peripheral adhesion protrusion portion 26 and the inner peripheral adhesion recess portion 45 without any gaps.

The outer end of the side surface forming the inner peripheral adhesion recess portion 45 is in contact with a portion of the annular cover 20 between the inner peripheral adhesion protrusion portion 26 and the positioning portion 27. On the other hand, the inner peripheral adhesion protrusion portion 26 and the inner peripheral adhesion recess portion 45 are not in contact with each other. The inner peripheral adhesive 92 is interposed between the inner peripheral adhesion protrusion portion 26 and the inner peripheral adhesion recess portion 45.

Figure 9:
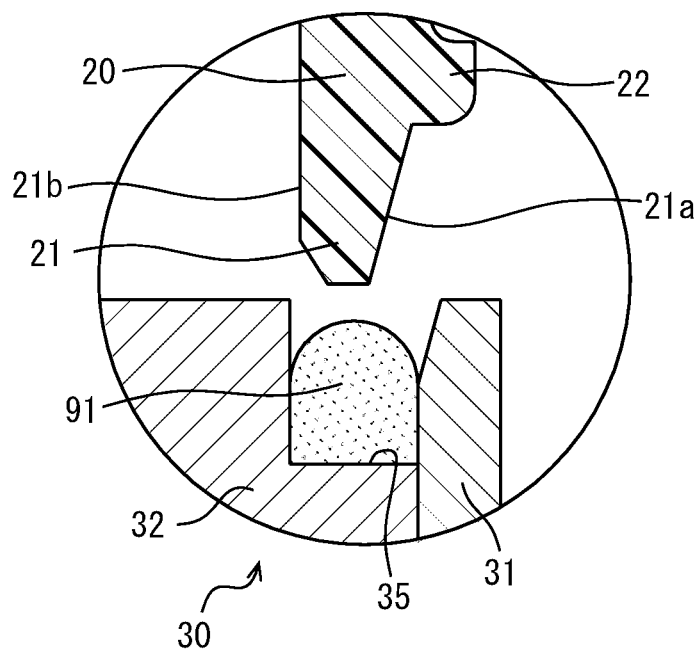
FIG. 9 is an explanatory view showing a state prior to bonding between an outer peripheral adhesion protrusion portion and an outer peripheral adhesion recess portion.

The bonding by the outer peripheral adhesive 91 will be described below. FIG. 9 shows a state before the outer peripheral adhesion protrusion portion 21 and the outer peripheral adhesion recess portion 35 are bonded to each other. The outer peripheral adhesive 91 is provided in the outer peripheral adhesion recess portion 35 and is surrounded on three sides. The outer peripheral adhesive 91 is applied so as to be in contact with two components, i.e., the motor case 31 and the frame end 32. At this point, the outer peripheral adhesive 91 is in a soft state prior to hardening. The distal end of the outer peripheral adhesion protrusion portion 21 is tapered such that the thickness of the outer peripheral adhesion protrusion portion 21 is smallest at its distal end.

In FIG. 9, the outer peripheral adhesion protrusion portion 21 and the outer peripheral adhesion recess portion 35 are brought close to each other, showing a state immediately prior to inserting the distal end portion of the outer peripheral adhesion protrusion portion 21 into the outer peripheral adhesion recess portion 35. The direction in which the outer peripheral adhesion protrusion portion 21 is inserted into the outer peripheral adhesion recess portion 35 is the direction in which the annular cover 20 is assembled. In other words, the projection direction of the outer peripheral adhesion protrusion portion 21 is the same as the direction in which the annular cover 20 is assembled.

The annular cover 20 is moved in the mounting direction beyond the position where the outer peripheral adhesion protrusion portion 21 contacts the outer peripheral adhesive 91. As a result, the outer peripheral adhesive 91 is pushed out by the outer peripheral adhesion protrusion portion 21, and the outer peripheral adhesive 91 spreads to each corner. Therefore, even if the outer peripheral adhesive 91 is discontinuously applied prior to the bonding, the outer peripheral adhesive 91 is expanded and spread by the outer peripheral adhesion protrusion portion 21 so that the outer peripheral adhesive 91 is continuously provided in a ring shape.

Figure 10:
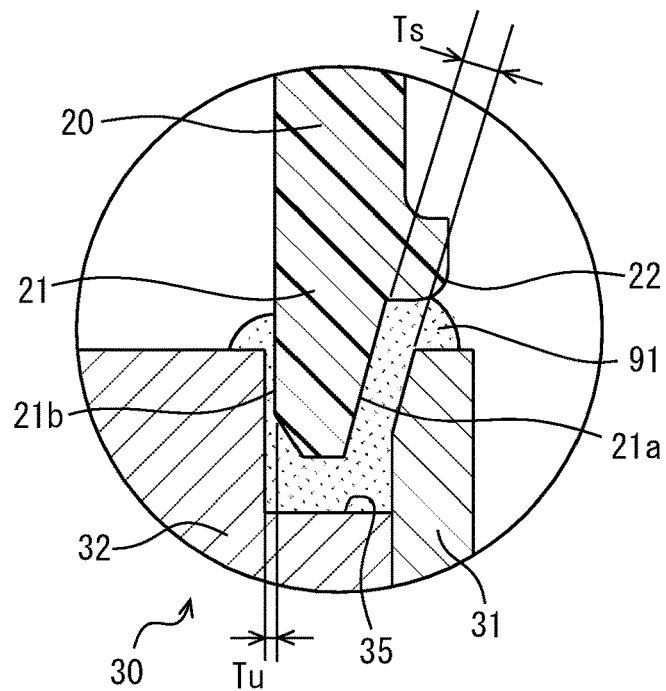
FIG. 10 is an explanatory view showing a state after bonding between an outer peripheral adhesion protrusion portion and an outer peripheral adhesion recess portion.

FIG. 10 shows a state after the outer peripheral adhesion protrusion portion 21 and the outer peripheral adhesion recess portion 35 are adhered to each other. The outer peripheral adhesive 91 is in contact with three different components, i.e., the annular cover 20, the motor case 31, and the frame end 32, and fixedly adheres each component to each other. At this point, the outer peripheral adhesive 91 is solidified in a state of being provided continuously in an annular manner between the outer peripheral adhesion protrusion portion 21 and the outer peripheral adhesion recess portion 35. In other words, the outer peripheral adhesive 91 fills the space between the outer peripheral adhesion protrusion portion 21 and the outer peripheral adhesion recess portion 35 without any gap.

The outer peripheral adhesion protrusion portion 21 has a plurality of opposing surfaces facing the outer peripheral adhesion recess portion 35. Among the plurality of opposing surfaces of the outer peripheral adhesion protrusion portion 21, the surfaces facing directions intersecting the mounting direction of the annular cover 20 are referred to as side opposing surfaces. The side facing surfaces of the outer peripheral adhesion protrusion portion 21 include an outward facing surface 21a and an inward facing surface 21b. The outward facing surface 21a faces the outer side surface of the outer peripheral adhesion recess portion 35 located radially outward with respect to the rotation axis of the motor 11. The inward facing surface 21b is faces the inner side surface of the outer peripheral adhesion recess portion 35 located radially inward with respect to the rotation axis of the motor 11.

A thickness Ts of the outer peripheral adhesive 91 located between the outward facing surface 21a and the outer peripheral adhesion recess portion 35 is larger than a thickness Tu of the outer peripheral adhesive 91 located between the inward face surface 21b and the outer peripheral adhesion recess portion 35. By providing the outer peripheral adhesive 91 with a sufficient thickness, the bonding function and the sealing function of the outer peripheral adhesive 91 can be improved.

Prior to hardening, the outer peripheral adhesive 91 spreads to fill the space between the outer peripheral adhesion protrusion portion 21 and the outer peripheral adhesion recess portion 35, and reaches the outer surface protrusion portion 22. Upon reaching the outer surface protrusion portion 22, the outer peripheral adhesive 91 is unable to further spread along the outer surface of the annular cover 20 in the mounting direction. For this reason, the outer peripheral adhesive 91 is guided by the outer surface protrusion portion 22 and spreads in a direction that intersects the assembly direction.

The outer surface protrusion portion 22 and the end of the motor case 31 face each other along the assembly direction. Part of the outer peripheral adhesive 91 is located in a space between the outer surface protrusion portion 22 and the end portion of the motor case 31. In other words, a part of the outer peripheral adhesive 91 adheres the outer surface protrusion portion 22 to the end portion of the motor case 31. Therefore, compared to the case where the outer surface protrusion portion 22 is not provided, a larger bonding surface can be provided.

When the outer peripheral adhesive 91 is continuously provided in a ring shape on the outer surface of the drive device 1 between the outer surface protrusion portion 22 and the frame 30, the drive unit 10 and the annular cover are properly bonded and fixed to each other by the outer peripheral adhesive 91. In this state, foreign substances are prevented from entering through spaces between the outer peripheral adhesion protrusion portion 21 and the outer peripheral adhesion recess portion 35. In other words, after completion of the bonding process using the outer peripheral adhesive 91, it is possible to check whether each component is appropriately bonded to each other or not by checking whether or not the outer peripheral adhesive 91 is continuously provided in a ring between the outer surface protrusion portion 22 and the frame 30. In this case, it is preferable to use an opaque adhesive as the outer peripheral adhesive 91. The color of the outer peripheral adhesive 91 is preferably different from the color of the annular cover 20 and the frame 30. Doing so would make it easier to visually confirm whether or not the outer peripheral adhesive 91 is exposed.

The outer surface protrusion portion 22, which protrudes as an eave from the outer surface of the annular cover 20, also functions to protect the outer peripheral adhesive 91 from external impacts. For example, even if pebbles or the like are likely to collide with the outer peripheral adhesive 91 exposed on the outer surface of the drive device 1, the pebbles are less likely to directly collide with the outer peripheral adhesive 91 due to collision with the outer surface protrusion portion 22. According to this, it is possible to prevent the outer peripheral adhesive 91 from peeling off the annular cover 20 and the frame 30 due to external impacts, and prevent the outer peripheral adhesive 91 from being cracked. Therefore, the outer peripheral adhesive 91 can easily perform the two functions bonding and fixing the components to each other as well as acting as a seal to prevent foreign substances from entering the drive device 1 over a long period of time. In particular, when the drive device 1 is mounted on a vehicle, the drive device 1 is likely to come into contact with pebbles or the like during traveling. Therefore, a configuration for protecting the outer peripheral adhesive 91 from collision with pebbles or the like is very useful when the drive device 1 is used for a vehicle.

The bonding with the outer peripheral adhesive 91 and the bonding with the inner peripheral adhesive 92 are performed simultaneously. In other words, the annular cover 20 and the drive unit 10 are bonded to each other at two locations simultaneously: the locations where the outer peripheral adhesive 91 and the inner peripheral adhesive 92 are applied.

According to the above-described embodiment, the drive device 1 includes the inner peripheral adhesive 92 that bonds the inner peripheral end of the annular cover 20 to the drive unit 10, and includes the outer peripheral adhesive 91 that bonds the outer peripheral end of the annular cover 20 to the drive unit 10. For this reason, the annular cover 20 and the drive unit 10 can be adhesively fixed to each other at two locations, i.e., the inner peripheral end and the outer peripheral end. Therefore, compared with the case where the annular cover 20 and the drive unit 10 are fixed at one place, the components are more likely to be firmed adhered together. Therefore, it is possible to provide the drive device 1 in which components are properly adhered and fixed to each other. In particular, since the bonding locations are provided at the inner peripheral end portion and the outer peripheral end portion, the bonded portions are physically separated from each other. Therefore, even when an external force is applied to the vicinity of one end of the device, the adhesion at the other end is likely to be maintained properly. In addition, even when foreign matter collides strongly with one end of the device, proper adhesion is likely to be maintained at the other end.

The inner peripheral adhesive 92 adheres the inner peripheral adhesion protrusion portion 26 to the inner peripheral adhesion recess portion 45, and the outer peripheral adhesive 91 adheres the outer peripheral adhesion protrusion portion 21 to the outer peripheral adhesion recess portion 35. For this reason, compared with the case where the inner peripheral adhesive 92 or the outer peripheral adhesive 91 are adhered to flat surfaces, a large bonding surface area may be provided. Therefore, the adhesive strength of the inner peripheral adhesive 92 and the outer peripheral adhesive 91 may be increased.

The inner peripheral adhesive 92 adheres the inner peripheral adhesion protrusion portion 26 to the inner peripheral adhesion recess portion 45 in a continuous annular shape, and the outer peripheral adhesive 91 adheres the outer peripheral adhesion protrusion portion 21 to the outer peripheral adhesion recess portion 35 in a continuous annular shape. For this reason, the inner peripheral adhesive 92 and the outer peripheral adhesive 91 are able to bond and fix the components to each other while also preventing foreign substances from entering between the components. Therefore, it is possible to fixedly bond the various components to each other while also providing a seal between the components with a simple configuration.

The thickness Ts of the outer peripheral adhesive 91 located between the outward facing surface 21a and the outer peripheral adhesion recess portion 35 is larger than the thickness Tu of the outer peripheral adhesive 91 located between the inward facing surface 21b and the outer peripheral adhesion recess portion 35. Therefore, it is possible to reliably prevent foreign matter from entering on the upstream side of the foreign matter entry path. Therefore, the outer peripheral adhesive 91 can reliably prevent foreign matter from entering the drive device 1. In addition, the thickness of the portion of the outer peripheral adhesive 91 near the outer surface, which is likely to be deteriorated by being exposed to the external environment, is relatively large. For this reason, the bonding function and the sealing function of the outer peripheral adhesive 91 may be reliably provided over a long period of time.

The annular cover 20 includes the outer surface protrusion portion 22 which protrudes from the outer surface of the annular cover 20. The outer surface protrusion portion 22 faces the end portion of the drive unit 10. For this reason, the outer surface protrusion portion 22 can restrict the outer peripheral adhesive 91, which overflows out between the outer peripheral adhesion recess portion 35 and the outer peripheral adhesion protrusion portion 21, from spreading along the outer surface of the annular cover 20. Therefore, it is possible to control the extent to which outer peripheral adhesive 91 is exposed to the outside. As a result, by checking the outer peripheral adhesive 91 exposed to the outside, it is easy to confirm whether the outer peripheral adhesive 91 is distributed over the entire circumference of the device.

The outer surface protrusion portion 22 also functions to protect the outer peripheral adhesive 91 from external impacts. In other words, the outer surface protrusion portion 22 is referred to as an outer peripheral protection portion. Therefore, it is possible to prevent the outer peripheral adhesive 91 from peeling off from the drive unit 10 or the annular cover 20. For this reason, the bonding function and the sealing function of the outer peripheral adhesive 91 may be reliably provided over a long period of time.

Further, a part of the outer surface protrusion portion 22 and the end portion of the motor case 31 can be bonded to each other with the outer peripheral adhesive 91. For this reason, compared with the case where the outer surface protrusion portion 22 is not provided, a larger bonding surface of the outer peripheral adhesive 91 can be secured. As a result, a state in which the drive unit 10 and the annular cover 20 are properly bonded and sealed can be more reliably maintained.

The outer peripheral adhesive 91 is opaque. Therefore, it is easy to visually confirm whether the outer peripheral adhesive 91 exposed to the outside. As a result, it is possible to smoothly confirm whether or not the drive unit 10 and the annular cover 20 are appropriately bonded to each other and sealed by the outer peripheral adhesive 91.

The annular cover 20 includes a positioning portion 27 for determining the position of the annular cover 20 with respect to the drive unit 10. Therefore, the relative positions of the inner peripheral adhesion recess portion 45 and the inner peripheral adhesion protrusion portion 26 can be appropriately maintained. Further, the relative positions of the outer peripheral adhesion recess portion 35 and the outer peripheral adhesion protrusion portion 21 can be appropriately maintained. Therefore, the annular cover 20 can be easily adhered and fixed at an appropriate position using the inner peripheral adhesive 92 and the outer peripheral adhesive 91.

As a result, it is possible to provide the drive device 1 in which the components are well bonded to each other and properly sealed.

The protrusion amount Lp of the positioning portion 27 is greater than the protrusion amount Lb of the inner peripheral adhesion protrusion portion 26. For this reason, when attaching the annular cover 20 to the drive unit 10, the positioning portion 27 is more likely to come into contact with the drive unit 10 before the inner peripheral adhesion protrusion portion 26 does. Therefore, the inner peripheral adhesion protrusion portion 26 can be inserted into the inner peripheral adhesion recess portion 45 in a state where the positioning of the annular cover 20 relative to the drive unit 10 is appropriate set by the positioning unit 27. Therefore, appropriate adhesion between the drive unit 10 and the annular cover 20 can be more reliably performed smoothly.

The positioning portion 27 includes the inclined portion 27a whose projection amount increases as the distance from the inner peripheral adhesion protrusion portion 26 increases. Therefore, when the drive unit 10 and the annular cover 20 are bonded to each other, the position of the annular cover 20 can be guided along the inclined portion 27a after the tip of the positioning portion 27 comes into contact with the connector 41. As a result, the inner peripheral adhesion protrusion portion 26 can be smoothly inserted into the inner peripheral adhesion recess portion 45.

The inner peripheral adhesive 92 adheres the annular cover 20 to the connector 41, and the outer peripheral adhesive 91 adheres the annular cover to the frame 30. In other words, the annular cover 20 is adhesively fixed to two different parts. Therefore, even if a large external force is applied to the connector 41 or the frame 30 and deforms the connector 41 or the frame 30, the drive unit 10 will remain fixedly adhered to the other, non-deformed component. As a result, the annular cover 20 is less likely to fall off.

The outer peripheral adhesion recess portion 35 is formed in the frame 30. For this reason, the annular cover 20 can be directly adhered and fixed to the frame 30 which is a component for fixing the motor 11. Therefore, compared to the case where the annular cover 20 is indirectly fixed to the frame 30, the state in which the frame 30 and the annular cover 20 are adhesively fixed to each other is more easily maintained. If the annular cover 20 is fixed to only the connector 41, the annular cover 20 will be detached from the drive unit 10 not only when the annular cover 20 is detached from the connector 41 but also when the connector 41 is detached from the frame 30. In particular, when the drive device 1 is mounted on a vehicle, the drive device 1 is easily affected by vibrations during traveling. For this reason, the configuration in which the annular cover 20 does not easily come off even when a large vibration is applied is very useful when the drive device 1 is used for a vehicle.

In addition, when the frame 30 is made of metal, volume change with respect to temperature change is smaller than that of resin components, and it is easier to maintain an appropriate bonding state with the outer peripheral adhesive 91. In particular, when the drive device 1 is mounted on a vehicle, the drive device 1 is exposed to an external environment, and temperature may change greatly. For this reason, a configuration in which the annular cover 20 is easily maintained in a properly bonded state even when a large temperature change occurs is very useful when the drive device 1 is used for a vehicle.

The outer peripheral adhesive 91 adheres the annular cover 20, the motor case 31, and the frame end 32 to each other. Therefore, there is no need to provide a first seal member between the motor case 31 and the annular cover 20 and provide a second seal member different from the first seal member between the frame end 32 and the annular cover 20. In other words, the sealability of a plurality of components can be simultaneously secured by the outer peripheral adhesive 91 as one member. Therefore, manufacturability is improved, and the drive device 1 may be designed to be small and thin.

Second Embodiment

The present embodiment is a modification in which the preceding embodiment is a base embodiment. In this embodiment, the annular cover 20 includes an inner peripheral protection portion 228.

Figure 11:
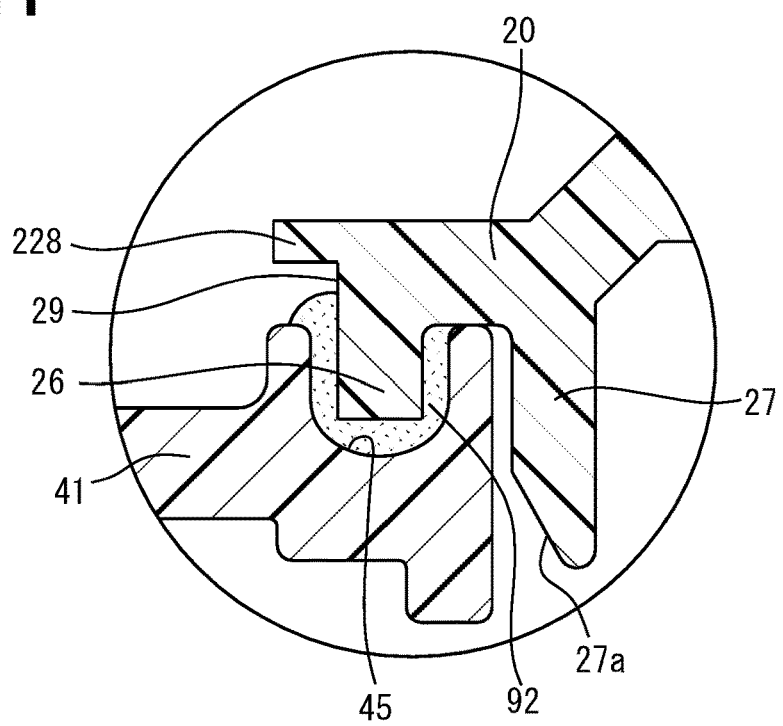
FIG. 11 is an explanatory view showing a state after bonding between an inner peripheral adhesion protrusion portion and an inner peripheral adhesion recess portion in a second embodiment.

In FIG. 11, the annular cover 20 includes an inner peripheral protection portion 228 that protrudes from the inner peripheral opening 29 toward the center of the inner peripheral opening 29. The protrusion amount of the inner peripheral protection portion 228 is greater than the thickness of the inner peripheral adhesive 92 between the inner peripheral adhesion protrusion portion 26 and the inner peripheral adhesion recess portion 45. The inner peripheral protection portion 228 is shaped to cover the inner peripheral adhesive 92 from the side where the inner peripheral adhesion protrusion portion 26 protrudes. The inner peripheral protection portion 228 is provided annularly over the entire periphery of the inner peripheral opening 29.

If a foreign object comes into contact with the drive device 1 from the side of the annular cover 20, the foreign object will collide with the inner peripheral protection portion 228, thereby preventing the foreign object from directly colliding with the inner peripheral adhesive 92. In other words, the inner peripheral protection portion 228 has a protection function of protecting the inner peripheral adhesive 92 from external impact. This can prevent the inner peripheral adhesive 92 from peeling off from the connector 41 or the annular cover 20.

According to the above-described embodiment, the annular cover 20 includes the inner peripheral protection portion 228 that is provided to protrude from the inner peripheral opening 29 toward the center of the inner peripheral opening 29. For this reason, it is possible to prevent the inner peripheral adhesive 92 from coming off the drive unit 10 and the annular cover 20. For this reason, the bonding function and the sealing function of the inner peripheral adhesive 92 may be reliably provided over a long period of time.

OTHER EMBODIMENTS

Entry of foreign matter between the drive unit 10 and the annular cover may be prevented by using an annular contact component such as an O-ring. In this case, the outer peripheral adhesive 91 and the inner peripheral adhesive 92 do not need to have a sealing function for preventing foreign substances from entering the inside of the drive device 1, and can be used solely for their adhesive function. Alternatively, both an O-ring and the adhesives may be used to prevent foreign matter from entering to increase redundancy. According to this, it is possible to more reliably prevent water from splashing on the circuit substrate 15 and the like, and to easily operate the drive device 1 stably.

When sealing property is ensured by using an annular contact component such as an O-ring, the O-ring needs to be closely attached to a portion where the sealing property is desired to be ensured. For this reason, a structure for making the O-ring adhere closely is required. Further, when sealing property is ensured by using an O-ring, it is necessary to prevent the O-ring from shifting in position in order to prevent the O-ring from shifting during assembly. Therefore, a structure for preventing the displacement of the O-ring is required. On the other hand, when the sealing property is provided by adhesives, the adhesives are in a soft state before hardening and follows the bonding surface. For this reason, there is no need to provide a structure for adhering the adhesive or a structure for preventing displacement of the adhesive. Therefore, by using adhesives, it is possible to ensure sealing property with a simple configuration. Therefore, it is easier to design the drive device 1 to be thinner and smaller.

When the sealing property is ensured using an annular close contact component such as an O-ring, the portions in contact with the O-ring serves as a sealing surface. For this reason, in order to ensure a large sealing surface, it is necessary to use a large O-ring or to use a plurality of O-rings. On the other hand, when sealing property is ensured by using adhesives, a large sealing surface can be easily ensured by providing irregularities on the sealing surface.

The disclosure in this specification and drawings is not limited to the exemplified embodiments. The disclosure includes the exemplified embodiments and variations thereof by those skilled in the art based thereon. For example, the disclosure is not limited to the combinations of components and/or elements shown in the embodiments. The disclosure may be implemented in various combinations. The disclosure may have additional parts that can be added to the embodiments. The disclosure encompasses omission of components and/or elements of the embodiments. The disclosure encompasses the replacement or combination of components and/or elements between one embodiment and another. The disclosed technical scope is not limited to the description of the embodiments. It should be understood that some disclosed technical ranges are indicated by description of claims, and includes every modification within the equivalent meaning and the scope of description of claims.

The disclosure in the specification, drawings and the like is not limited by the description of the claims. The disclosures in the specification, the drawings, and the like encompass the technical ideas described in the claims, and further extend to a wider variety of technical ideas than those in the claims. Therefore, various technical ideas can be extracted from the disclosure of the specification, the drawings and the like without being limited to the description of the claims.

The invention claimed is:

1. A drive device, comprising:
an annular cover having an inner peripheral opening portion;
a drive unit to which the annular cover is attached;
an inner peripheral adhesive that adheres an inner peripheral end portion of the annular cover to the drive unit; and
an outer peripheral adhesive that adheres an outer peripheral end portion of the annular cover to the drive unit, wherein
the drive unit includes
a motor,
a frame in which the motor is housed in a fixed state, and
a connector provided separately from the frame and fixed to the frame,
the inner peripheral adhesive adheres the annular cover and the connector, and
the outer peripheral adhesive adheres the annular cover to the frame.

2. The drive device according to claim 1, wherein
the inner peripheral end portion is an inner peripheral adhesion protrusion portion, which has an annular shape, that protrudes toward the drive unit,
the outer peripheral end portion is an outer peripheral adhesion protrusion portion, which has an annular shape, that protrudes toward the drive unit,
the drive unit includes
an inner peripheral adhesion recess portion, which has an annular shape, that faces the inner peripheral adhesion protrusion portion, and
an outer peripheral adhesion recess portion, which has an annular shape, that faces the outer peripheral adhesion protrusion portion, and
the inner peripheral adhesive adheres the inner peripheral adhesion protrusion portion to the inner peripheral adhesion recess portion, and the outer peripheral adhesive adheres the outer peripheral adhesion protrusion portion to the outer peripheral adhesion recess portion.

3. The drive device according to claim 2, wherein
the inner peripheral adhesive adheres the inner peripheral adhesion protrusion portion to the inner peripheral adhesion recess portion in a continuous annular shape, and the outer peripheral adhesive adheres the outer peripheral adhesion protrusion portion to the outer peripheral adhesion recess portion in a continuous annular shape.

4. The drive device according to claim 2, wherein
the outer peripheral adhesion protrusion portion includes
an inward facing surface that faces an annular shaped inner surface of the outer peripheral adhesion recess portion, and
an outward facing surface that faces an annular shaped outer surface of the outer peripheral adhesion recess portion, and
a thickness of the outer peripheral adhesive located between the outward facing surface and the outer peripheral adhesion recess portion is greater than a thickness of the outer peripheral adhesive located between the inward facing surface and the outer peripheral adhesion recess portion.

5. The drive device according to claim 2, wherein
the annular cover includes a positioning portion for determining a position of the annular cover with respect to the drive unit.

6. The drive device according to claim 5, wherein
the positioning portion is provided so as to protrude from the annular cover in a direction along a protruding direction of the inner peripheral adhesion protrusion portion, and
a protrusion amount of the positioning portion is greater than a protrusion amount of the inner peripheral adhesion protrusion portion.

7. The drive device according to claim 5, wherein
the positioning portion includes an inclined portion whose protrusion amount increases with distance from the inner peripheral adhesion protrusion portion.

8. The drive device according claim 5, wherein
the positioning portion is provided in the annular cover, and
the positioning portion faces the inner peripheral adhesion recess portion.

9. The drive device according claim 2, wherein
an inner peripheral protection portion that protrudes from the inner peripheral opening portion toward a center of the inner peripheral opening portion, and
the inner peripheral protection portion is shaped to cover the inner peripheral adhesive from a side where the inner peripheral adhesion protrusion portion protrudes.

10. The drive device according to claim 1, wherein
the annular cover includes an outer surface protrusion portion that protrudes from an outer surface of the annular cover and that faces an end portion of the drive unit.

11. The drive device according to claim 1, wherein
the frame includes
a motor case having a cylindrical shape, and
a frame end fixed to the motor case, and
the outer peripheral adhesive adheres the annular cover, the motor case, and the frame end to each other.

12. The drive device according claim 1, wherein
the connector has, on an outer peripheral end, an inner peripheral adhesion recess portion having an annular shape, and
the inner peripheral adhesive adheres the inner peripheral end portion of the annular cover to the inner peripheral adhesion recess portion.

13. The drive device according claim 12, wherein
the frame has, on an outer peripheral end, an outer peripheral adhesion protrusion portion having an annual shape,
the outer peripheral adhesive adheres the outer peripheral end portion of the annular cover to the outer peripheral adhesion protrusion portion, and
the inner peripheral adhesion recess portion is provided apart from the frame.

* * * * *